Jan. 7, 1941.   G. McCORMICK ET AL   2,227,733
PEDESTAL SAFETY TIE BAR
Filed July 29, 1940   3 Sheets-Sheet 1

Inventors
George McCormick
Ben M. Brown
By Henry Fuchs Atty.

Jan. 7, 1941.  G. McCORMICK ET AL  2,227,733
PEDESTAL SAFETY TIE BAR
Filed July 29, 1940   3 Sheets-Sheet 2

Inventors
George McCormick
Ben M. Brown
By Henry Fuchs Atty.

Jan. 7, 1941. G. McCORMICK ET AL 2,227,733
PEDESTAL SAFETY TIE BAR
Filed July 29, 1940 3 Sheets-Sheet 3
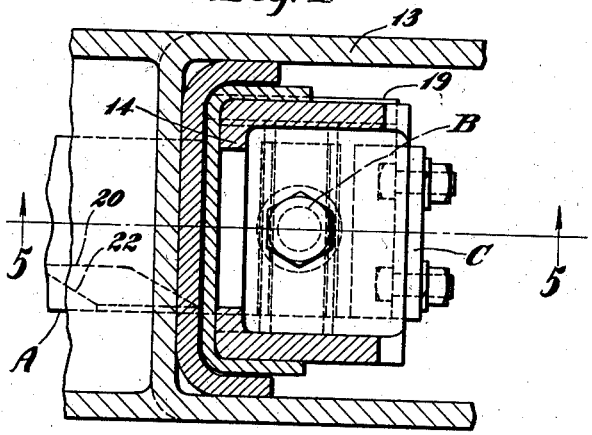
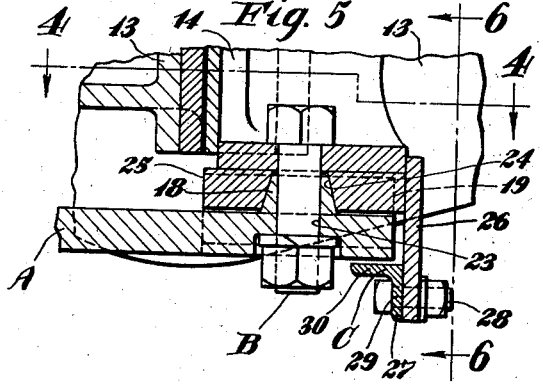
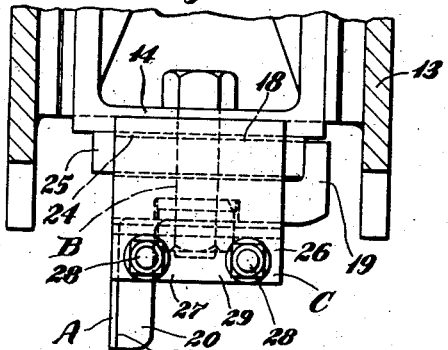
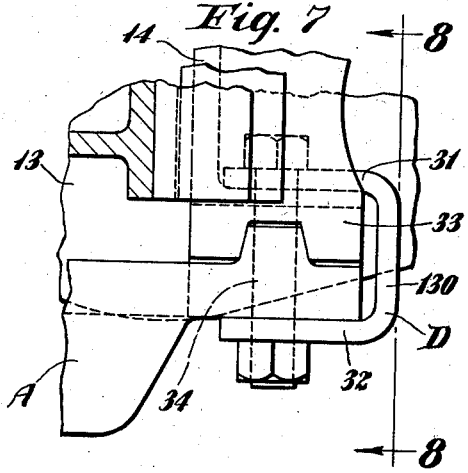
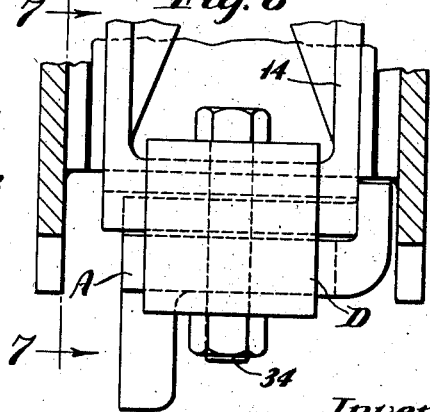
Inventors
George McCormick
Ben M. Brown
By Henry Fuchs Atty.

Patented Jan. 7, 1941

2,227,733

UNITED STATES PATENT OFFICE 2,227,733

PEDESTAL SAFETY TIE BAR

George McCormick, Redwood City, and Ben M. Brown, Palo Alto, Calif.

Application July 29, 1940, Serial No. 348,080

8 Claims. (Cl. 104—242)

This invention relates to improvements in railway car trucks, in the form of a safety device for preventing excessive lateral displacement of the trucks of the car in the event of derailment.

One object of the invention is to provide a member on the truck of a car which is adapted to engage one side of the rail of the track structure when the car wheel drops off of the rail, thereby preventing excessive lateral displacement of the truck of the car, thus keeping the trucks and the car supported thereon in line with the rails of the track to avoid serious damage to the cars of the train due to the same being thrown out of line.

Another object of the invention is to provide a safety device which becomes operative in case of derailment of the cars of a train to prevent excessive lateral displacement of the car trucks, so arranged that the rail will become engaged between the safety device and the wheels of the car, thus maintaining alignment with the railway track when the wheels leave the rail.

A more specific object of the invention is to provide a safety device of the character indicated in the preceding paragraph in the form of a tie bar for the truck pedestal, having a depending portion adapted to engage the outer side of the rail when the wheels of the car drop off of the rail, the rail thus being embraced between said depending portion and the wheels to guide the truck and keep the same in line with the rail.

Other objects of the invention will more clearly appear from the description and claims hereinafter following.

Figure 1:
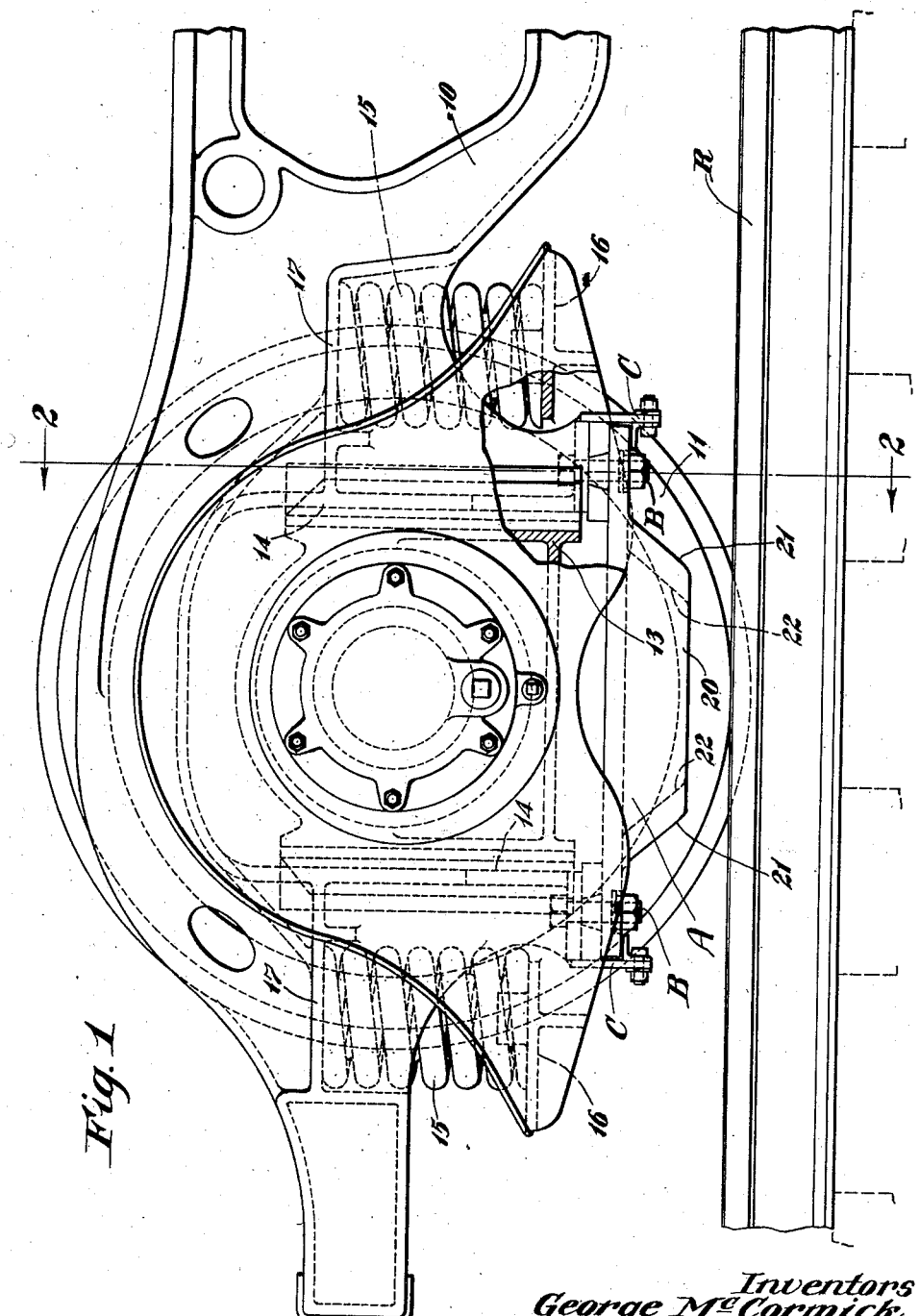
Figure 2:
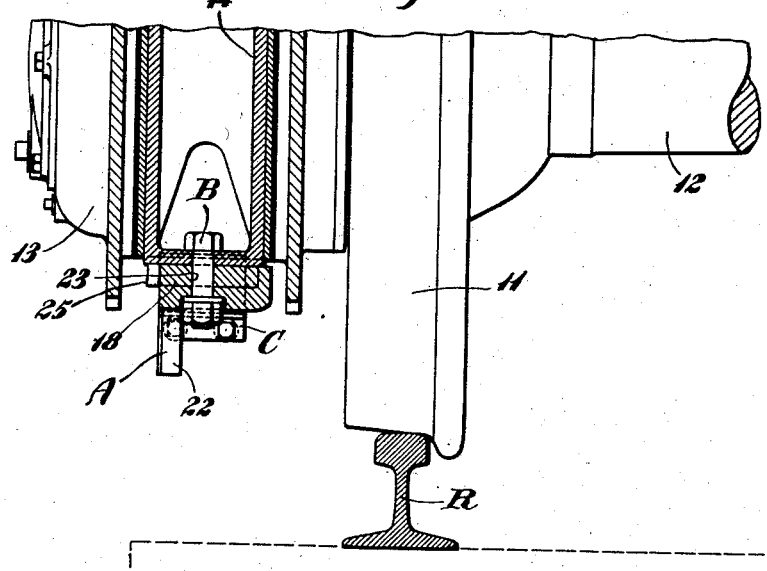
Figure 3:
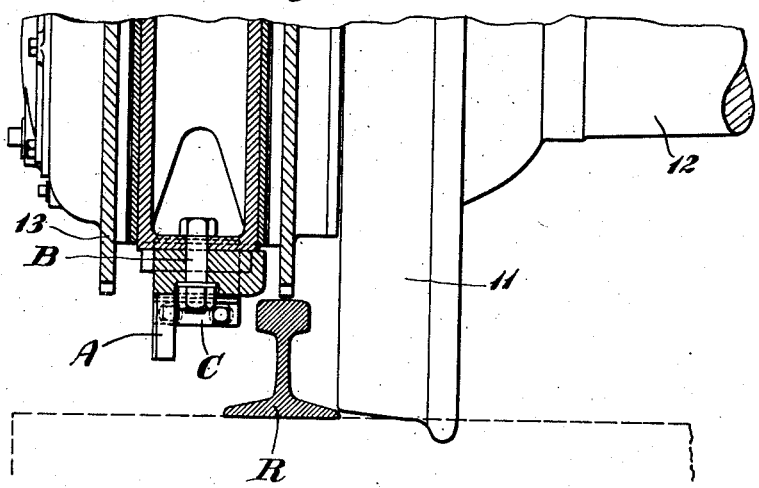

In the drawings forming a part of this specification, Figure 1 is a broken side elevational view of a portion of a truck of a railway car illustrating our improvements in connection therewith. Figure 2 is a vertical sectional view, corresponding substantially to the line 2—2 of Figure 1, the upper portion of the structure shown in Figure 1 being broken away. Figure 3 is a view similar to Figure 2 but showing the parts in different position, that is, a position assumed when the car wheel has dropped off of the track in derailment. Figure 4 is a horizontal sectional view, on an enlarged scale, through the truck structure at the pedestal thereof, said view corresponding substantially to the line 4—4 of Figure 5. Figure 5 is a vertical sectional view, corresponding substantially to the line 5—5 of Figure 4. Figure 6 is a vertical sectional view, corresponding substantially to the line 6—6 of Figure 5. Figure 7 is a front elevational and part vertical sectional view, on an enlarged scale, similar to the view shown in Figure 1 of the pedestal structure and adjacent parts at the right hand side of said figure, illustrating another embodiment of the invention, the section corresponding substantially to the line 7—7 of Figure 8. Figure 8 is a vertical sectional view, corresponding substantially to the line 8—8 of Figure 7.

In said drawings, 10 indicates a portion of the frame of a passenger car truck of well-known design provided with the usual pedestals between the legs of which journal boxes for the axles of the truck wheels are guided. In the drawings one only of the wheels of the car truck is shown, the same being indicated by 11. The wheel 11 is carried by the axle 12, which is journaled at its outer ends in the journal boxes of the truck structure. One of said journal boxes is indicated by 13. The box 13, which is of well-known design, is guided for vertical movement between the legs of the truck pedestals 14—14, which depend from the truck frame. The truck springs, which are indicated by 15—15, are interposed between ledges 16—16 on the journal box 13 and spring seats 17—17 on the truck frame, and serve to resiliently support the truck frame on the journal box. One only of the rails of the track structure is shown in Figures 1, 2, and 3, the same being indicated by R.

Referring first to the embodiment of the invention illustrated in Figures 1 to 6 inclusive, our improvements comprise broadly a bar A which serves both as a tie member for the truck pedestals and a safety device in case of derailment, securing bolts B—B, and safety supports C—C.

The combined safety tie bar A is in the form of an elongated member of preferably rectangular cross section, which spans the space between the truck pedestals at the lower ends of the latter in the manner of the usual tie bar. At opposite ends, the bar A is provided with upstanding lugs 18—18 in the form of transverse ribs which extend from the front to the rear edge of the bar. As shown most clearly in Figures 1 and 5, these lugs or ribs 18—18 are preferably upwardly tapered. The lugs 18—18 may be formed directly on the bar A or may be in the form of separate blocks secured thereto by welding. At the rear edge the bar A is provided with upstanding flanges 19—19 at opposite ends thereof, which extend lengthwise of the bar, as most clearly shown in Figure 6. Between its ends, at the front edge thereof, the bar A has a relatively long, heavy, depending flange 20 having downwardly and inwardly inclined end edges 21—21, which are preferably beveled off on their inner sides, as indicated at 22—22. These inclined beveled ends facilitate engagement of the bar with the rail of the track.

The bar A is secured to the bottom ends of the truck pedestals 14—14 in the manner of the usual tie bar, the upwardly tapered lugs 18—18 being seated in correspondingly downwardly opening tapered seats 24—24 in the lower ends of the pedestals. The seats 24—24 are preferably in the form of transverse slots. As shown these seats are formed in blocks 25—25 which are welded to the pedestal members 14—14 and thus form integral parts of the pedestals. However, instead of being separate blocks secured to the pedestal of the truck, these portions may be fabricated as projections on the pedestals.

The bolts B—B extend through the openings 23—23 of the bar A and into the pedestals proper of the truck frame and serve to tightly lock the bar in place. As shown most clearly in Figures 5 and 6, when the bar A is secured in place by the bolts B—B, the tapered lugs 18—18 are seated securely in the seats 24—24, thereby holding the bar firmly in place through the wedging action between the lugs and seats. With the bar A in the secured position, the flanges 19—19 at the ends of the bar are engaged in back of the blocks 25—25 on the pedestals. As will be evident, the flanges 19—19 reenforce the anchoring of the bar A against laterally outwardly directed thrust, thereby relieving the bolts B—B from strain.

The safety supports C—C include vertically disposed, relatively short bars 26—26 secured at their upper ends to the outer ends of the blocks 25—25, being preferably welded thereto. The bar 26 of each support extends downwardly beyond the bar A and has an angle bracket 27 secured to the inner side thereof by a bolt 28 extending through the bar 26 and the vertically disposed depending flange 29 of the bracket. The other flange 30 of the angle bracket 27, which is at the upper end thereof, extends horizontally and projects inwardly into underlying relation with the bar A, thus forming a supporting shelf for said bar in the emergency that the bar becomes accidentally detached. As shown most clearly in Figure 5, a certain amount of clearance is provided between the flange 30 of the bracket 27 and the underneath side of the bar A so that the bar normally does not actually rest on the bracket but may drop onto the same to be supported thereby.

As will be further seen upon reference to Figure 5, slight clearance is provided between the underneath faces of the blocks 25—25 of the pedestals 14—14 and the top face of the bar A to assure full entrance and solid seating of the wedge-shaped lugs 18—18 of the bar A in the seats 24—24 of the pedestals.

Upon reference to Figures 2 and 3, it will be seen that in the event of accidental derailment of the car, the wheel 11 in leaving the rail R will drop down onto the road bed, as shown in Figure 3, and the truck of the car will thus be lowered to bring the flange 20 of the tie bar A below the level of the upper surface of the rail. The rail R is thus embraced between the flange of the tie bar and the wheel, and the truck guided in line with the rail as the car advances along the track. The flange of the tie bar and the car wheel thus form guides on opposite sides of the rail cooperating with the latter to determine the direction of movement of the car.

Inasmuch as the tie bars are located on both sides of the trucks of the car, either one or the other of the rails of the track will become engaged between the tie bar and the wheel at the corresponding side of the truck. On a curve this would usually be the inside rail. On a straight track it would be the rail opposite to the direction of lateral movement of the train during derailment.

In this connection it is pointed out that inasmuch as the direction of movement of the tie bar A which is effective is always toward the rail at the corresponding side of the track in derailment, the thrust on the flange 19 of the bar and the bar itself is outward and the flange 19 is therefore always effective in properly bracing and holding the bar against lateral separation from the pedestal, and to take the strain from the connecting bolts.

Referring next to the embodiment of the invention illustrated in Figures 7 and 8, the construction is identical with that illustrated in Figures 1 to 6 inclusive with the exception that holding clips D—D are substituted for the safety supports C—C. Each holding clip is in the form of a U-shaped member having an upright section 30 and top and bottom arms 31 and 32. The top arm 31 engages over a ledge 33 on the corresponding truck pedestal and the arm 32 engages underneath the corresponding end of the bar A. Each clip D is secured in place by a bolt 34 extending through the arms of the clip, the bar A, and the lower end portion of the corresponding pedestal. As will be evident, the clips D—D form reenforcing safety means for holding the bar A in position on the truck pedestal in the event of failure of the bolts 34—34.

From the preceding description taken in connection with the drawings, it will be evident that we have provided an exceedingly efficient and rugged safety device for holding the cars of a train in line with the tracks in case of derailment, wherein the safety device, in addition to its function as such, also serves as the tie bar for the truck pedestals of the car.

We have herein shown and described what we now consider the preferred manner of carrying out our invention, but the same is merely illustrative and we contemplate all changes and modifications that come within the scope of the claims appended hereto.

We claim:

1. In a safety tie bar for railway car trucks including a wheel member adapted to ride on a rail and mounted on an axle journaled in a bearing mounted for sliding movement between a pair of spaced pedestal members of a truck frame, the combination with a tie bar having its opposite ends secured respectively to said pedestal members and spanning the opening between said pair of members; of a depending flange on said bar between the ends of said bar, spaced outwardly of said wheel and extending lengthwise of the truck, having its bottom edge spaced above the rail engaging portion of the wheel a distance less than the height of the rail.

2. In a safety tie bar for railway car trucks including a wheel member adapted to ride on a rail and mounted on an axle journaled in a bearing mounted for sliding movement between a pair of spaced pedestal members of a truck frame, the combination with a tie bar secured at its opposite ends respectively to the pedestal members and spanning the opening between said members; of a depending guide portion directly on said bar, between the opposite ends of the same, spaced outwardly of the outer face of the wheel, and adapted to project below the top of the rail when the car wheel drops off of the rail.

3. In a safety tie bar for railway car trucks including a wheel member adapted to ride on a rail and mounted on an axle journaled in a bearing mounted for sliding movement between a pair of spaced pedestal members of a truck frame, the combination wtih a one piece tie bar secured at opposite ends to the pedestal members and spanning the space between said members at the lower ends thereof; of a depending integral guide flange on said bar between the ends of said bar, said flange being disposed outwardly of the rail, and spaced from the outer face of the wheel at the corresponding side of the car truck to have said flange and wheel embrace the rail from opposite sides when the wheel drops off of the rail at the inner side of the latter.

4. In a safety tie bar for railway car trucks including a wheel member adapted to ride on a rail and mounted on an axle journaled in a bearing mounted for sliding movement between a pair of spaced pedestal members of a truck frame, the combination with a combined tie bar and guide spanning the space between said pedestal members and having its opposite ends secured respectively to said truck pedestal members; of a depending, projecting guide portion on the tie bar integral therewith adapted to lie on the outer side of the rail and extending below the top of the rail when the car wheel leaves the rail and drops below the latter on the inner side thereof.

5. In a safety device for car trucks having spaced truck pedestal members, the combination with a tie bar abutting the bottom ends of said pedestal members; of a depending guide flange on the front side, said bar extending lengthwise of the truck and adapted to have guiding engagement with the outer side of the rail of the track when said truck becomes derailed; an upstanding rear flange on said tie bar extending lengthwise of said bar and engaging in back of the pedestal members to brace said bar against lateral outward displacement; and means for securing said tie bar to said bottom ends of the pedestal members.

6. In a safety device for car trucks having spaced pedestal members, the combination with a combined tie bar and guide secured to the bottom ends of said pedestals, said bar having guide means thereon cooperating with the outer side of the railway track when the truck is derailed to align said truck with said track; of a safety support for said bar, comprising a member secured to said truck and depending below said bar and having a laterally extending shelf underlying the end of the bar.

7. In a safety device for car trucks having spaced pedestal members, the combination with a tie bar spanning the opening between said members; of a depending flange on said bar extending in a direction lengthwise of the truck, said flange being adapted to overhang the outer side of the rail of the railway track when the truck becomes derailed; and means for securing said tie bar to the truck pedestal member, comprising a clip having an arm extending beneath the tie bar and secured to the truck pedestal.

8. In a safety device for car trucks having spaced pedestal members, the combination with a tie bar spanning the space between said members, said bar having a depending guide portion adapted to cooperate with the rail of a railway track in case of derailment of the truck; and means for securing said tie bar to the truck pedestals, including a U-shaped clip at each end of the bar having one arm in shouldered engagement with one of the truck pedestal members and having the other arm underlying the corresponding end of the tie bar, and a bolt extending through the arms of the clip of the tie bar and a portion of the pedestal member to secure said tie bar to said pedestal member.

GEORGE McCORMICK.
BEN M. BROWN.